Nov. 30, 1937.   D. A. S. LAING   2,100,399
POWDERED MATERIAL APPLYING APPARATUS
Filed April 17, 1936
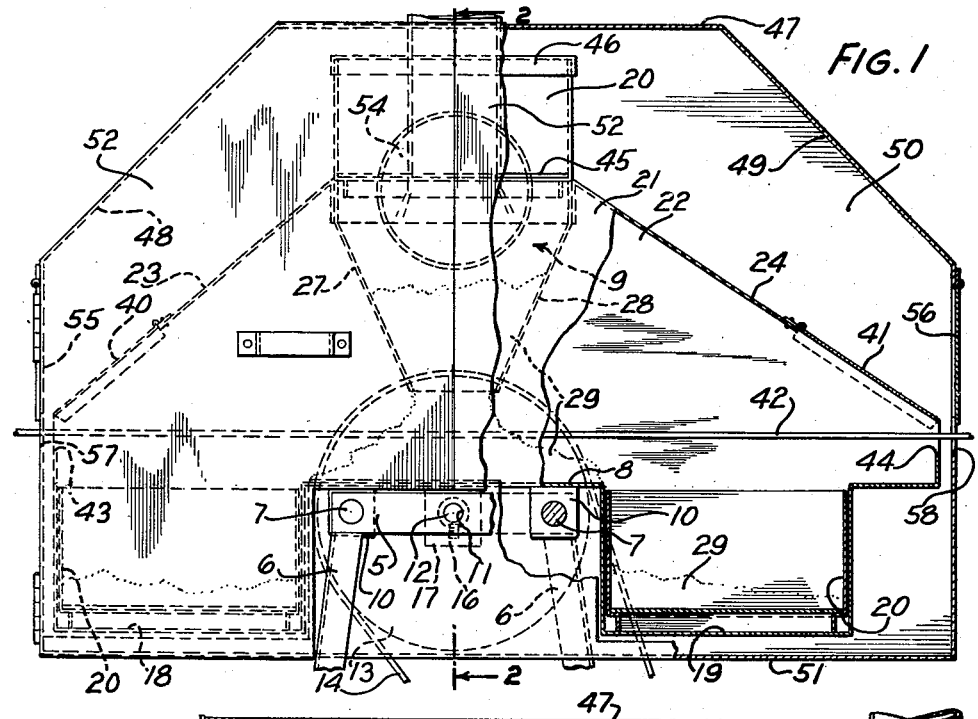
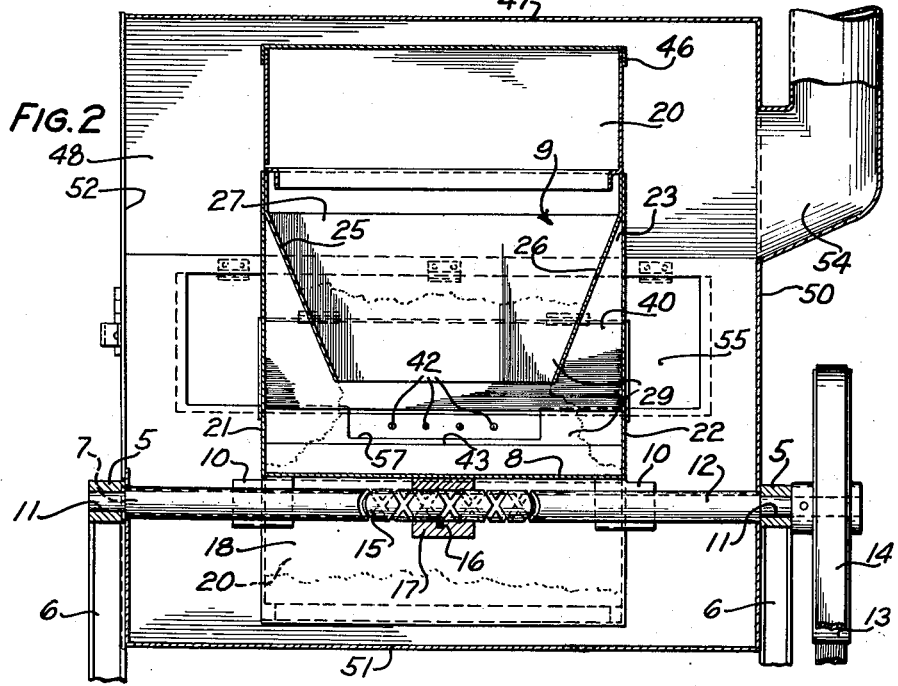
INVENTOR
D. A. S. LAING
BY H. Q. Whitehorn
ATTORNEY Patented Nov. 30, 1937

2,100,399

UNITED STATES PATENT OFFICE 2,100,399

POWDERED MATERIAL APPLYING APPARATUS

David A. S. Laing, Montreal, Quebec, Canada, assignor to Western Electric Company, Incorporated, New York, N. Y., a corporation of New York Application April 17, 1936, Serial No. 74,827

6 Claims. (Cl. 91—46)

This invention relates to powdered material applying apparatus, and more particularly to apparatus for applying powdered material to strands coated with a tacky substance.

It is an object of the present invention to provide a simple and inexpensive apparatus for applying an even coating of powdered material to an article.

In accordance with one embodiment of the invention as applied to apparatus for applying powdered mica to stearin pitch coated electrical conductors, there is provided an enclosed hopper for receiving a supply of powdered mica and delivering it to a table positioned beneath the hopper. A plurality of conductors which have been coated with stearin pitch are passed through the supply of mica on the table. The table and hopper are secured together and reciprocated transversely to the direction of movement of the pitch coated conductors by a reversing screw arrangement so that the conductors will receive an even coating of mica and will not tend to form tunnels in the supply of mica on the table. The hopper and table have associated therewith receptacles for receiving mica which falls off of the table, and the entire structure is enclosed in a housing which may be connected to an exhaust system for removing dust laden atmosphere from the vicinity of the machine.

A better understanding of the invention will be had by reference to the following detailed description considered in conjunction with the accompanying drawing, wherein:

Fig. 1 is a side elevational view of an apparatus for applying powdered mica to strands coated with a tacky substance such as stearin pitch, parts being broken away to more clearly show the construction of the apparatus, and Fig. 2 is a vertical sectional view taken along the line 2—2 of Fig. 1 in the direction of the arrows.

Referring now to the drawing wherein like characters designate the same parts throughout the several views, the apparatus is supported by a rectangular frame 5 which is in turn supported on suitable standards 6—6. Extending between the sides of the frame 5 are a pair of tie rods 7—7 upon which a table and a hopper, indicated by the numbers 8 and 9, respectively, are slidably mounted by means of guide blocks 10 which surround the tie rods and are slidable thereupon.

Journaled in the sides of the frame 5 at 11—11 is a shaft 12 having a pulley 13 fixed to one end thereof. The pulley 13 is adapted to be driven from a suitable source of power (not shown) by a belt 14. Formed on the shaft 12 adjacent the middle thereof is a reversing screw 15 cooperating with which is a pawl 16 mounted in a block 17 secured to the underside of the table 8. The table 8 has its upper surface bent downwardly to form two U-shaped receptacles 18 and 19 in which trays 20 may be placed. Secured to the sides of the table 8 are vertically disposed sides 21 and 22 to the upper ends of which the hopper 9 is secured. The sides 21 and 22 of the table are irregularly shaped and have end portions 23 and 24 associated therewith to form an inner hood within which the table 8 and hopper 9 are enclosed. The hopper 9 has tapered sides 25 and 26 and tapered ends 27 and 28 for directing a supply of powdered mica 29 onto the upper surface of the table 8.

There are provided a pair of doors 40 and 41 in the end portions 23 and 24 to permit strands 42 which may be electrical conductors coated with stearin pitch, to be threaded through the apparatus between the table 8 and the hopper 9. It will be noted that the lower ends of the doors 40 and 41 (Fig. 1) do not engage with the end portions 23 and 24, but that slots 43 and 44 are formed at this point to permit the passage of the strands 42 through the apparatus. The strands are adapted to be coated with pitch by any suitable means (not shown) and to be drawn through the apparatus by the usual reeling mechanisms (not shown).

The upper end of the hopper 9 is of a size which will permit one of the trays 20 to be set into the open end of the hopper. The trays 20 are provided with removable bottoms 45 so that the tray filled with mica may be placed on the upper edges of the hopper, and after a cover 46 has been placed on the tray, the bottom 45 may be withdrawn to permit the powdered mica to fall into the hopper and from the hopper onto the table 8.

In order to prevent undesirable quantities of powdered mica from getting into the atmosphere, a suitable housing is secured to the frame 5. The housing comprises a top 47, end portions 48 and 49, and a side portion 50, a bottom portion 51, and a pair of side doors 52. The side portion 50 of the housing has an exhaust pipe 54 connected thereto through which undesirable dust laden atmosphere may be drawn off by any suitable exhaust system (not shown).

In order to provide access to the doors 40 and 41 of the inner housing, the end portions 48 and 49 are equipped with gates or doors 55 and 56, respectively, the lower ends of which terminate at slots 57 and 58 in alignment with the slots 43 and 44. The slots 43 and 44 are substantially longer than the slots 57 and 58 to permit reciprocation of the table 8 and hopper 9 and associated parts.

It is believed that a better understanding of the invention will be had by the following short description of the operation thereof.

After a number of strands 42 coated with a tacky substance such as stearin pitch have been directed through the apparatus, a supply of powdered mica may be placed in a tray 20, cover 46 placed on the tray 20, and the doors 52 opened to permit the tray to be placed on the top of the hopper 9, whereupon the removable bottom 45 may be withdrawn from the tray to permit the powdered mica 29 to fall into the hopper and through the hopper onto the top of the table 8, whereupon after the doors 52 have been closed the shaft 12 may be rotated through the belt 14 and pulley 13 to impart a reciprocating motion to the table and hopper transversely to the direction in which the strands 42 are adapted to be moved. The strands may then be drawn through the apparatus while the table and hopper are moving to and fro. Any powdered mica which falls off of the table 8 will be caught in the trays 20 positioned in the receptacles 18 and 19. After a predetermined interval the doors 52 may be opened and a tray 20 having a quantity of powdered mica therein may be removed from either of the receptacles 18 or 19 and placed upon the hopper 9. In operation very little powdered mica will be lost due to the fact that the trays 20 catch the mica which falls off the table and the trays may be placed on top of the hopper 9 and this mica again used. The movement of the hopper and table transversely of the direction of movement of the strands 42 will prevent the strands from forming tunnels in the powdered mica on the table and will thereby insure that an even coating of mica will be distributed over all of the strands.

Although a particular embodiment of the invention has been disclosed hereinbefore, it will be understood that applicant's invention is to be limited only by the scope of the appended claims.

What is claimed is:

1. In an apparatus for applying powdered material to moving articles, a table for supporting a supply of said material in the path of said moving articles, a hopper for maintaining the supply of material on said table, and means for moving said hopper and table in a direction transverse to the direction of movement of said articles.

2. In an apparatus for applying powdered material to strands, a table for supporting a supply of said material in the path of strands moving through said apparatus, a hopper for supplying said material to the table, and means for imparting a reciprocating motion to said table and hopper in a direction transverse to the direction of travel of said strands.

3. A powdered material applying apparatus for applying powdered material to moving articles including a hopper for receiving a supply of powdered material, a table positioned beneath said hopper for supporting material dropped from said hopper, means for slidably supporting said table, and a reversing screw mechanism for sliding said table and hopper transversely to the direction of movement of the articles.

4. In an apparatus for applying powdered material to moving articles, an enclosed table, a hopper enclosed with said table for suppying powdered material to said table, means for moving said table and hopper transversely to the path of said articles, and means alternately transferable from position to catch material falling from said table to position to supply material to said hopper.

5. In an apparatus for applying powdered material to moving articles, an enclosed table, a hopper enclosed with said table for supplying powdered material to said table, means for moving said table and hopper transversely to the path of said articles, and a tray transferable from position to catch material falling from said table to position to supply material to said hopper.

6. In an apparatus for applying powdered material to moving articles, an enclosed table, a hopper enclosed with said table for supplying powdered material to said table, means for moving said table and hopper transversely to the path of said articles, and a tray having a removable bottom for catching material falling from said table and transferable to position to deposit material in said hopper upon removal of said removable bottom.

DAVID A. S. LAING.